(12) United States Patent
Lee et al.

(10) Patent No.: US 8,619,914 B2
(45) Date of Patent: *Dec. 31, 2013

(54) RECEIVER AND RECEIVING METHOD FOR SCALABLE BANDWITH

(71) Applicants: Electronics and Telecommunications Research Institute, Daejon (KR); Samsung Electronics Co., Ltd., Suwon-si (KR)

(72) Inventors: Moon-Sik Lee, Daejon (KR); Nam-Il Kim, Daejon (KR); Hyeong-Geun Park, Daejon (KR); Il-Gyu Kim, Seoul (KR); Young-Hoon Kim, Deajon (KR); Seung-Chan Bang, Daejon (KR)

(73) Assignees: Electronics and Telecommunications Research Institute, Daejeon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,544

(22) Filed: Nov. 21, 2012

(65) Prior Publication Data
US 2013/0084880 A1    Apr. 4, 2013

(30) Foreign Application Priority Data

Oct. 11, 2006 (KR) .................. 10-2006-0099048
Dec. 8, 2006 (KR) .................. 10-2006-0125161

(51) Int. Cl.
*H04L 27/00* (2006.01)

(52) U.S. Cl.
USPC ........... 375/316; 375/224; 375/240; 375/324; 375/326; 375/340; 375/344; 375/345; 455/75; 455/119; 455/130; 455/173.1; 455/182.1; 455/182.2; 455/192.1; 455/192.2; 455/219; 455/232.1; 455/234.1; 370/344; 370/480; 329/323; 329/327

(58) Field of Classification Search
USPC ......... 375/224, 240, 316, 324, 326, 340, 344, 375/345; 455/75, 119, 130, 173.1, 182.1, 455/182.2, 192.1, 192.2, 219, 232.1, 234.1; 370/344, 480; 329/323, 327
See application file for complete search history.

(56) References Cited

U.S. PATENT DOCUMENTS

| 7,424,066 B2 | 9/2008 | Montalvo et al. |
| 7,590,205 B2 | 9/2009 | Zipper |
| 2005/0147192 A1* | 7/2005 | Yamamoto et al. ........... 375/345 |

FOREIGN PATENT DOCUMENTS

| KR | 1020030031303 | 4/2003 |
| KR | 1020050108534 | 11/2005 |
| WO | 03/105390 A2 | 12/2003 |

OTHER PUBLICATIONS

3GPP, "3rd Generation Partnership Project; Technical Specification Group Radio Access Network; Physical layer aspects for evolved Universal Terrestrial Radio Access (UTRA) (Release 7)," 3GPP TR 25.814 V7.0.0, 126 pages, (2006).
Tubbax, Jan et al., "Compensation of IQ Imbalance and Phase Noise in OFDM Systems," IEEE Transactions on Wireless Communications, vol. 4(3):872-877 (2005).

* cited by examiner

*Primary Examiner* — Leon Flores
(74) *Attorney, Agent, or Firm* — Nelson Mullins Riley & Scarborough LLP

(57) ABSTRACT

Provided are a receiver and a receiving method for a scalable bandwidth in a mobile station of an Orthogonal Frequency Division Multiplexing (OFDM) system. The receiving method includes the steps of: (a) filtering a received RF signal; (b) oscillating a frequency according to a center frequency control signal to output a local oscillation frequency; (c) down-converting the filtered RF signal by using the local oscillation frequency; (d) scalable-filtering the down-converted signal while adjusting a bandwidth according to a bandwidth control signal; (e) controlling gain of the scalable-filtered signal; (f) converting the gain-controlled analog signal into a digital signal by using a sampling frequency matching with a corresponding bandwidth according to an ADC control signal; and (g) demodulating the converted digital signal, outputting the center frequency control signal, the bandwidth control signal, and the ADC control signal according to control information received from an upper layer.

3 Claims, 5 Drawing Sheets

RECEIVER AND RECEIVING METHOD FOR SCALABLE BANDWITH

RELATED APPLICATIONS

This application is a continuation of U.S. patent application Ser. No. 12/445,234, filed on Apr. 10, 2009, which is a national stage filing of PCT Application No. PCT/KR2007/004938, filed on Oct. 10, 2007, which claims priority to, and the benefit of, Korean Patent Application No. 10-2006-0099048, filed on Oct. 11, 2006 and Korean Patent Application No. 10-2006-0125161, filed on Dec. 8, 2006. The contents of the aforementioned applications are hereby incorporated by reference.

BACKGROUND

The present invention relates to a receiver and a receiving method for a scalable bandwidth in a mobile station of an Orthogonal Frequency Division Multiplexing (OFDM) system; and, more particularly, to a receiver and a receiving method for a scalable bandwidth, which can allow a mobile station having a specific bandwidth to access a variety of base stations each having a different bandwidth.

$3^{rd}$ Generation Partnership Project-Long Term Evolution (3GPP LTE) standard group suggests that a base station (BS) and a mobile station (MS) can have different bandwidths therebetween and the communication must be possible in such an environment.

In order to allow an MS having a specific bandwidth to access a variety of BSs each having a different bandwidth, the MS must have a receiver structure supporting a scalable bandwidth. 3GPP LTE TR25.814 specifies that an MS can have a bandwidth of 10 MHz or higher, e.g., 15 MHz, 20 MHz, etc. and a BS has a bandwidth of 1.25 MHz, 2.5 MHz, 5 MHz, 10 MHz, 15 MHz, and 20 MHz. Further, 3GPP LTE TR25.814 specifies Inverse Fast Fourier Transform/Fast Fourier Transform (IFFT/FFT) size and sampling frequency.

In the resource allocation of shared control channel (SCH) and broadcast channel (BCH), the SCH and the BCH have a bandwidth of 1.25 MHz regardless of a total transmission bandwidth of a BS and are located at the center of the total transmission bandwidth. Regarding a BS with a transmission bandwidth of 5 MHz or higher, a method of allocating 5 MHz to the BCH is under discussion.

A conventional receiver is configured to receive a signal of a fixed bandwidth because a communication bandwidth between a BS and an MS is fixed.

FIG. 1 is a block diagram of a conventional zero-intermediate frequency (IF) receiver.

Referring to FIG. 1, the conventional zero-IF receiver includes a band-pass filter (BPF) 102, a mixer 103, a radio frequency (RF) local oscillator 104, a low-pass filter (LPF) 105, an automatic gain controller (AGC) 106, an analog-to-digital converter (ADC) 107, and a modem block 108. The BPF 102 filters an RF signal received through a receive (RX) antenna 101 with a bandwidth within which all frequency allocations (FAs) of a service provider can be accommodated. The RF local oscillator 104 oscillates an RF frequency to output an RF local oscillation frequency. The mixer 103 converts the RF signal from the BPF 102 into a baseband signal by using the RF local oscillation frequency output from the RF local oscillator 104. The LPF 105 filters the baseband signal from the mixer 103 with a fixed bandwidth of a corresponding FA. The AGC 106 controls magnitude or gain of the baseband signal output from the LPF 105. The ADC 107 converts the analog baseband signal output from the AGC 106 into a digital baseband signal. The modem block 108 demodulates the digital baseband signal output from the ADC 107.

The conventional receiver cannot support a scalable bandwidth because the communication bandwidth between the BS and the MS is fixed.

Hence, many attempts have been made to perform radio measurements on adjacent cells and receive broadcast system information in order for handover without interrupting data reception of a current home cell.

SUMMARY

An embodiment of the present invention is directed to providing a receiver that can support a scalable bandwidth, and a receiving method thereof.

Another embodiment of the present invention is directed to providing a receiver that can support a scalable bandwidth by controlling a bandwidth using a scalable LPF and controlling a sampling frequency of an ADC, and a receiving method thereof.

Further another embodiment of the present invention is directed to providing a receiver that can shift a center frequency to a corresponding cell FA or an adjacent cell FA and can flexibly select an analog baseband filter according to a bandwidth of each BS.

Still further another embodiment of the present invention is directed to providing a receiver that can perform radio measurements on adjacent cells and receive broadcast system information in order for handover without interrupting data reception of a current home cell.

In accordance with an aspect of the present invention, there is provided a receiving method for supporting a scalable bandwidth, the receiving method including the steps of: (a) filtering a received RF signal; (b) oscillating a frequency according to a center frequency control signal to output a local oscillation frequency; (c) down-converting the filtered RF signal by using the local oscillation frequency; (d) scalable-filtering the down-converted signal while adjusting a bandwidth according to a bandwidth control signal; (e) controlling gain of the scalable-filtered signal; (f) converting the gain-controlled analog signal into a digital signal by using a sampling frequency matching with a corresponding bandwidth according to an ADC control signal; and (g) demodulating the converted digital signal, outputting the center frequency control signal, the bandwidth control signal, and the ADC control signal according to control information received from an upper layer.

In accordance with another aspect of the present invention, there is provided a receiving method, including the steps of: a) changing a center frequency to a center frequency of a home cell FA according to a first center frequency control signal, controlling a bandwidth to a bandwidth of the home cell FA according to a bandwidth control signal, and controlling a sampling frequency matching with the bandwidth of the home cell FA according to an ADC control signal, thereby forming a data communication path for communication with the home cell; b) changing the center frequency to a center frequency of a corresponding cell FA or an adjacent cell FA according to a second center frequency control signal, thereby forming a separate path; and c) demodulating a first digital signal received via the data communication path, outputting the first center frequency control signal, the bandwidth control signal, and the ADC control signal according to control information received from an upper layer, demodulating a second digital signal received via the separate path, and outputting the second center frequency control signal according to the control information received from the upper layer.

In accordance with embodiments of the present invention, the bandwidth and the sampling frequency of the ADC are adjusted using the scalable LPF and thus the scalable bandwidth can be supported.

Further, the center frequency can be smoothly shifted to the corresponding cell FA or the adjacent cell FA and the analog baseband filter for the bandwidth of each BS can be flexibly selected.

Furthermore, radio measurements on adjacent cells can be performed and broadcast system information can be received in order for handover without interrupting data reception of a current home cell.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

DETAILED DESCRIPTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

A zero-IF receiver and a receiving method thereof will be described below with reference to FIGS. 2 to 5.

Figure 1:
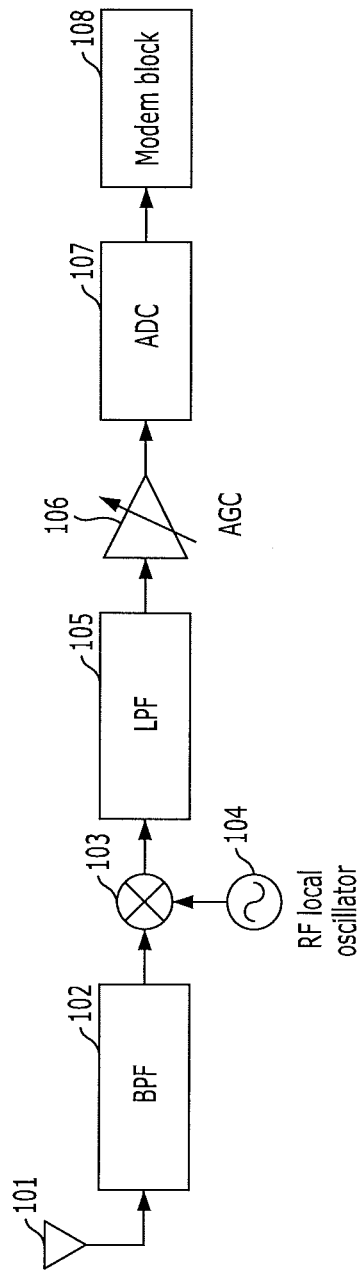
FIG. 1 is a block diagram of a conventional zero-IF receiver.
Figure 2:
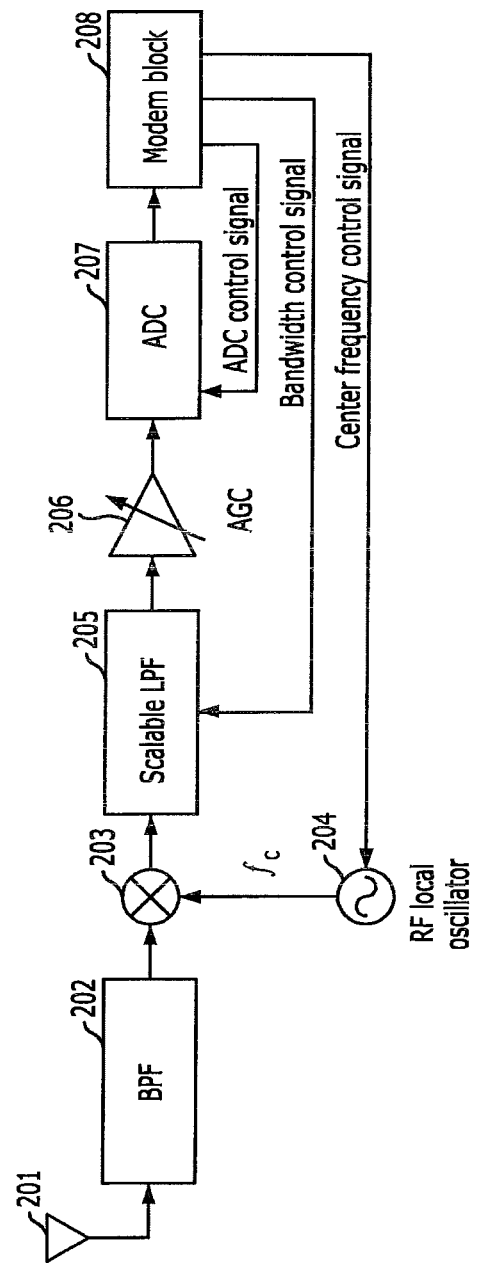
FIG. 2 is a block diagram of a zero-IF receiver supporting a scalable bandwidth in accordance with an embodiment of the present invention.

FIG. 2 is a block diagram of a zero-IF receiver supporting a scalable bandwidth in accordance with an embodiment of the present invention.

Referring to FIG. 2, the zero-IF receiver supporting the scalable bandwidth includes a BPF 202, a mixer 203, an RF local oscillator 204, a scalable LPF 205, an AGC 206, an ADC 207, and a modem block 108. The BPF 202 filters RF signal received through an RX antenna 201 with a bandwidth within which all FAs of the same service provider can be accommodated. The RF local oscillator 204 oscillates an RF frequency while shifting to a center frequency of a corresponding cell FA or an adjacent cell FA according to a center frequency control signal output from the modem block 208, and outputs an RF local oscillation frequency to the mixer 203. The mixer 203 converts the RF signal from the BPF 202 into a baseband signal by using the RF local oscillation frequency output from the RF local oscillator 204. The scalable LPF 205 filters the baseband signal from the mixer 203 while flexibly adjusting to the bandwidth of the corresponding cell FA or the adjacent cell FA according to a bandwidth control signal output from the modem block 208. The AGC 206 controls magnitude or gain of the baseband signal output from the scalable LPF 205. The ADC 207 converts the analog baseband signal output from the AGC 206 into a digital baseband signal by using a sampling frequency matching with a bandwidth of a corresponding cell FA or an adjacent cell FA according to an ADC control signal output from the modem block 208. The modem block 208 demodulates the digital baseband signal output from the ADC 207 according to FFT size specified in 3GPP LTE TR25.814, changes a center frequency of the RF local oscillator 204 by outputting the center frequency control signal to the RF local oscillator 204 according to the control information from the upper layer, controls the bandwidth of the scalable LPF 205 by outputting the bandwidth control signal to the scalable LPF 205, and controls the sampling frequency of the ADC 207 according to the bandwidth of the scalable LPF 205 by outputting the ADC control signal to the ADC 207.

The modem block 208 controls the RF local oscillator 204 according to the center frequency control signal from Layer 3 (L3) to output the center frequency ($f_c$) corresponding to the received center frequency control information. The center frequency ($f_c$) according to the center frequency control information is previously defined. For example, $f_c$=a [GHz] when the value of the control information is "0", and $f_c$=b [GHz] when the value of the control information is "1". When the RF local oscillator is a voltage controlled oscillator (VCO), the center frequency control signal output from the modem block 208 has a voltage value. The modem block 208 controls the scalable LPF 205 according to the bandwidth control signal from the Layer 3 (L3) to operate an LPF having a bandwidth (BW) corresponding to the received bandwidth control information. The bandwidth (BW) according to the bandwidth control information is previously defined. For example, BW=a [MHz] when the value of the control information is "0", and BW=b [MHz] when the value of the control information is "1". Since the scalable LPF 205 is implemented with a plurality of LPFs each having a different bandwidth, the bandwidth control signal output from the modem block 208 has a selection value for selecting an LPF to be used. Further, the modem block 208 operates the ADC 207 at the ADC sampling frequency ($f_{samp}$) corresponding to the received ADC sampling frequency control information. The ADC sampling frequency ($f_{samp}$) is previously defined. For example, $f_{samp}$=a [MHz] when the value of the control information is "0", and $f_{samp}$=b [MHz] when the value of the control information is "1". The ADC control signal output from the modem block 208 is an input clock signal of the ADC 207. Since modem blocks in accordance with other embodiments of the present invention have the same structure as that described above, their detailed description will be omitted later.

Figure 3:
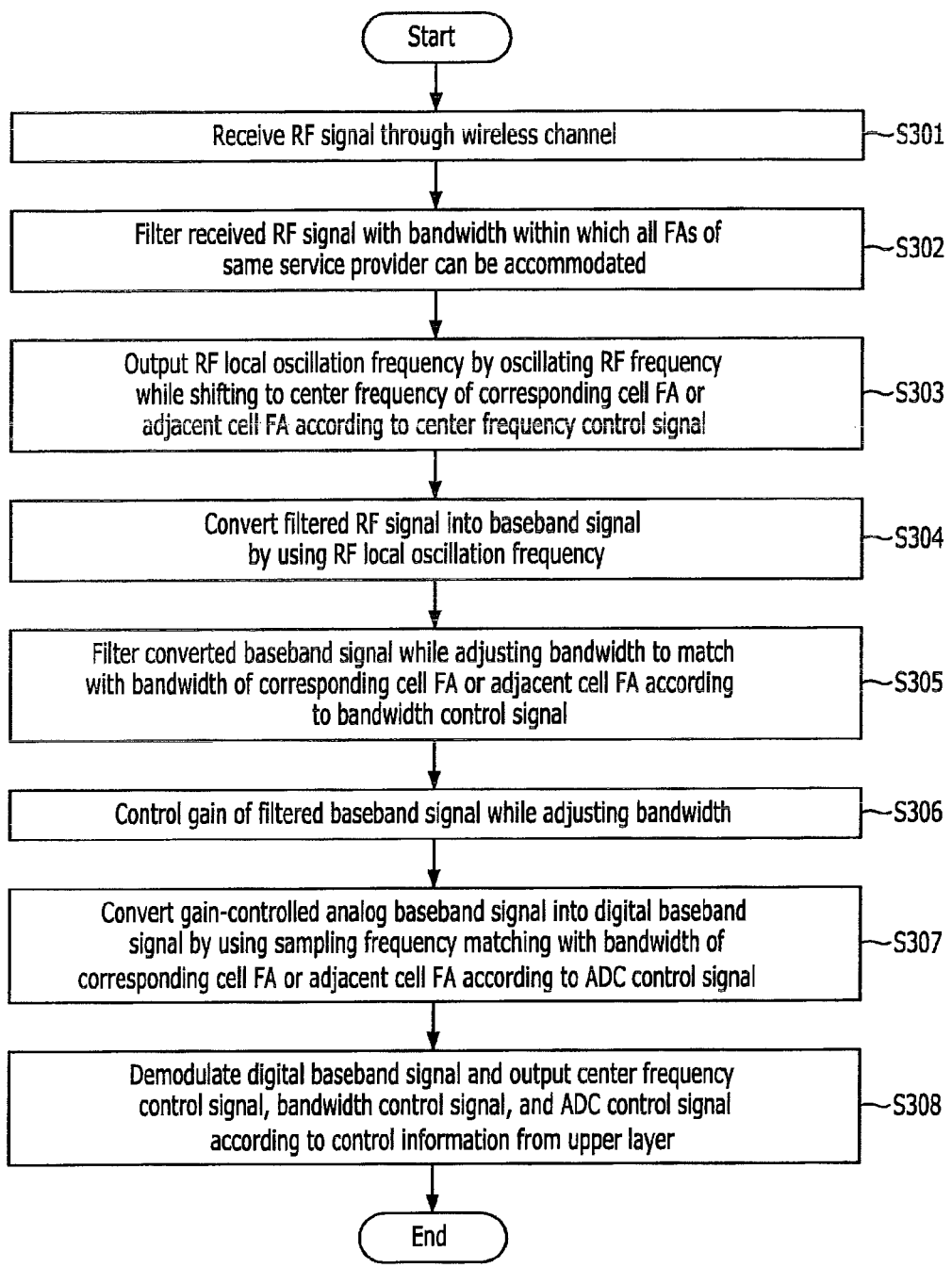
FIG. 3 is a flowchart illustrating a zero-IF receiving method supporting a scalable bandwidth in accordance with an embodiment of the present invention.

FIG. 3 is a flowchart illustrating a zero-IF receiving method supporting a scalable bandwidth in accordance with an embodiment of the present invention.

In step S301, the RX antenna 201 receives an RF signal from the transmitter over a wireless channel and transfers the received RF signal to the BPF 202.

In step S302, the BPF 202 filters the received RF signal with the bandwidth within which the FAs of the same service provider can be accommodated, and outputs the filtered RF signal to the mixer 203.

In step S303, the RF local oscillator 204 oscillates the RF frequency while shifting to the center frequency of the corresponding cell FA or the adjacent cell FA according to the center frequency control signal output from the modem block 208, and outputs the RF local oscillation frequency to the mixer 203. That is, the RF local oscillator 204 oscillates the RF frequency while shifting to the center frequency of the corresponding cell FA or the adjacent cell FA according to the center frequency control signal output from the modem block 208, thus making it possible for the mixer 203 to convert the RF signal from the BPF 202 into the baseband signal.

In step S304, the mixer 203 converts the RF signal from the BPF 202 into the baseband signal by using the RF local oscillation frequency output from the RF local oscillator 204, and outputs the baseband signal to the scalable LPF 205.

In step S305, the scalable LPF 205 filters the baseband signal from the mixer 203 while flexibly adjusting to the bandwidth of the corresponding cell FA or the adjacent cell FA according to the bandwidth control signal output from the modem block 208, and outputs the filtered baseband signal to the AGC 206.

In step S306, the AGC 206 controls magnitude or gain of the baseband signal output from the scalable LPF 205, and outputs it to the ADC 207.

In step S307, the ADC 207 converts the analog baseband signal output from the AGC 206 into the digital baseband signal by using the sampling frequency matching with the bandwidth of the corresponding cell FA or the adjacent cell FA according to the ADC control signal output from the modem block 208, and outputs the digital baseband signal to the modem block 208.

In step S308, the modem block 208 demodulates the digital baseband signal output from the ADC 207 according to FFT size specified in 3GPP LTE TR25.814, changes the center frequency of the RF local oscillator 204 by outputting the center frequency control signal to the RF local oscillator 204 according to the control information from the upper layer, controls the bandwidth of the scalable LPF 205 by outputting the bandwidth control signal to the scalable LPF 205, and controls the sampling frequency of the ADC 207 according to the bandwidth of the scalable LPF 205 by outputting the ADC control signal to the ADC 207.

Figure 4:
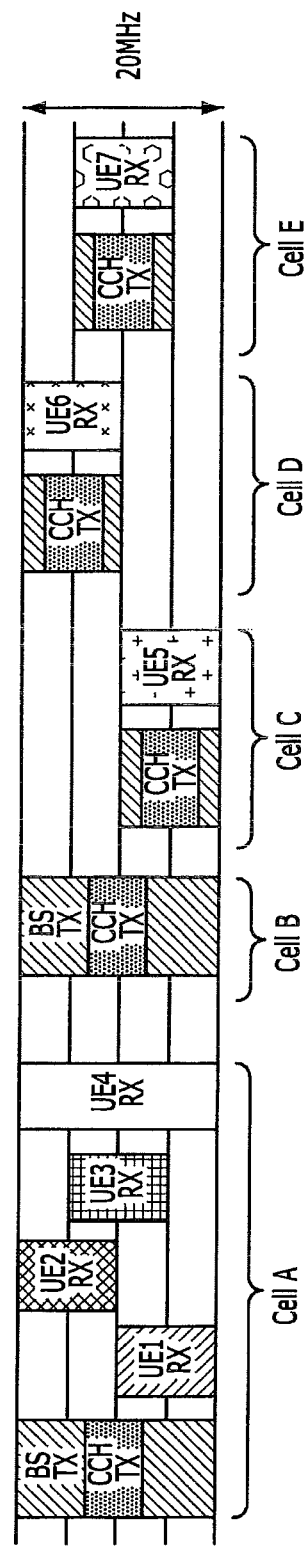
FIG. 4 is a diagram illustrating a variable bandwidth scenario in 3GPP LTE TR25.813.

FIG. 4 is a diagram illustrating a variable bandwidth scenario in 3GPP LTE TR25.813. Cells have a different bandwidth and a different center frequency, and a terminal or a receiver communicating with the cells has a different bandwidth and a different center frequency.

Figure 5:
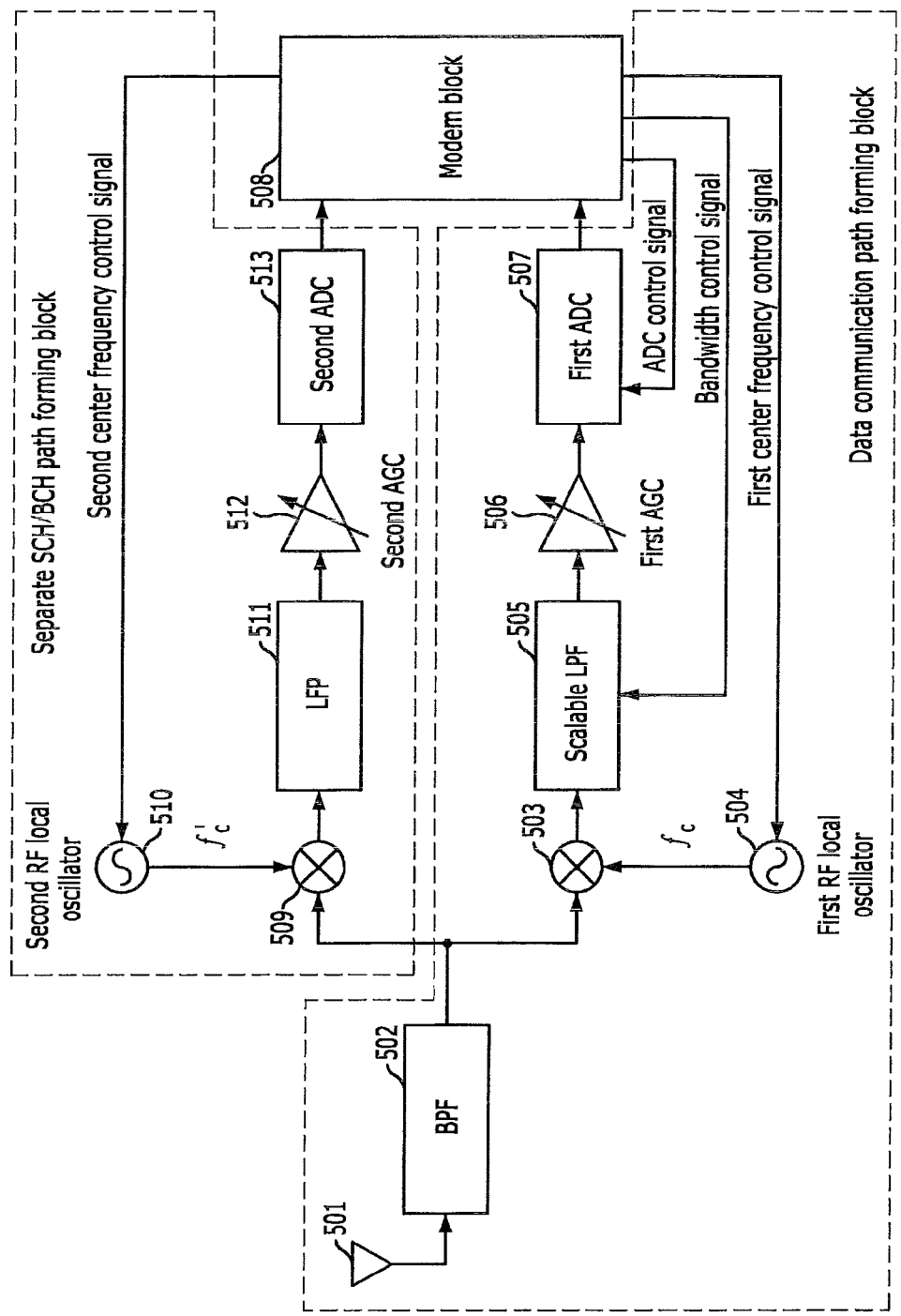
FIG. 5 is a block diagram of a zero-IF receiver supporting a scalable bandwidth in the variable bandwidth scenario environment of FIG. 4.

FIG. 5 is a block diagram of a zero-IF receiver supporting a scalable bandwidth in the variable bandwidth scenario environment of FIG. 4.

In FIG. 5, an upper path 509-513 is a separate SCH/BCH path for handover, a lower path 501-507 is a path for data communication with a home cell. In such a dual path structure, the radio measurement on the adjacent cell can be performed and the broadcast system information can be received for the handover without interrupting data reception of the home cell.

Referring to FIG. 5, the zero-IF receiver supporting the scalable bandwidth in the variable bandwidth scenario environment of FIG. 4 includes a data communication path forming block 501 to 507, a separate SCH/BCH path forming block 509 to 513, and a modem block 508.

The data communication path forming block 501 to 507 forms the path for the data communication with the home cell by changing the center frequency to the center frequency of the home cell FA according to a first center frequency control signal output from the modem block 508, adjusting the bandwidth to the bandwidth of the home cell FA according to the bandwidth control signal output from the modem block 508, and adjusting the sampling frequency corresponding to the bandwidth of the home cell FA according to the ADC control signal output from the modem block 508.

The data communication path forming block 501 to 507 includes a BPF 502, a first mixer or I/Q mixer 503, a first RF local oscillator 504, a scalable LPF 505, a first AGC 506, and a first ADC 507. The BPF 502 filters an RF signal received through an RX antenna 501 with a bandwidth within which all FAs of the same service provider can be accommodated. The first RF local oscillator 504 oscillates an RF frequency while shifting to a center frequency of a corresponding cell FA or an adjacent cell FA according to a first center frequency control signal output from the modem block 508, and outputs a first RF local oscillation frequency to the first mixer 503. The first mixer 503 converts the RF signal from the BPF 502 into a baseband signal by using the first RF local oscillation frequency output from the first RF local oscillator 504. The scalable LPF 505 filters the baseband signal from the first mixer 503 while flexibly adjusting to the bandwidth of the corresponding cell FA or the adjacent cell FA according to a bandwidth control signal output from the modem block 508. The first AGC 506 controls magnitude or gain of the baseband signal output from the scalable LPF 505. The first ADC 507 converts the analog baseband signal output from the first AGC 506 into a first digital baseband signal by using a sampling frequency matching with a bandwidth of a corresponding cell FA or an adjacent cell FA according to an ADC control signal output from the modem block 508.

The separate SCH/BCH path forming block 509 to 513 forms a separate SCH/BCH path for handover by changing the center frequency to the center frequency of the corresponding cell FA or the adjacent cell FA according to a second center frequency control signal output from the modem block 508.

The separate SCH/BCH path forming block 509 to 513 includes a second mixer or I/Q mixer 509, a second RF local oscillator 510, a fixed bandwidth LPF 511, a second AGC 512, and a second ADC 513. The second RF local oscillator 510 oscillates an RF frequency while shifting to the center frequency of the corresponding cell FA or the adjacent cell FA according to a second center frequency control signal output from the modem block 508, and outputs a second RF local oscillation frequency to the second mixer 509. The second mixer 509 converts the RF signal from the BPF 502 into a baseband signal by using the second RF local oscillation frequency output from the second RF local oscillator 510. The fixed bandwidth LPF 511 filters the baseband signal from the second mixer 509 according to the SCH or BCH bandwidth of the corresponding cell FA or the adjacent cell FA. The second AGC 512 controls magnitude or gain of the baseband signal output from the fixed bandwidth LPF 511. The second ADC 513 converts the analog baseband signal output from the second AGC 512 into a second digital baseband signal by using a sampling frequency matching with the SCH or BCH bandwidth of the corresponding cell FA or the adjacent cell FA.

Instead of the fixed bandwidth LPF 511, the separate SCH/BCH path forming block 509 to 513 may use a scalable LPF that filters the baseband signal output from the second mixer 509 while flexibly adjusting the bandwidth to the SCH or BCH bandwidth of the corresponding cell FA or the adjacent cell FA according to the bandwidth control signal output from the modem block 508.

The modem block 508 demodulates the first digital baseband signal received via the data communication path with the RX bandwidth of the home cell FA according to the FFT size specified in 3GPP LTE TR25.814, outputs the first center frequency control signal, the bandwidth control signal, and the ADC control signal to the data communication path forming block 503 to 507 according to the control information output from the upper layer, demodulates the second digital baseband signal received via the separate SCH/BCH path with the SCH or BCH bandwidth according to the FFT size specified in 3GPP LTE TR25.814, and outputs the second center frequency control signal to the separate SCH/BCH path forming block 509 to 513 according to the control information output from the upper layer.

Next, a digital intermediate frequency (DIF) receiver and a receiving method thereof will be described below. More specifically, a DIF receiver supporting a scalable bandwidth and a receiving method thereof will be described below.

First, the RX antenna receives an RF signal from a transmitter over a wireless channel and transfers the received RF signal to the BPF.

The BPF filters the received RF signal with the bandwidth within which all FAs of the same service provider can be accommodated, and outputs the filtered RF signal to the mixer.

The RF local oscillator oscillates the RF frequency while shifting to the center frequency of the corresponding cell FA or the adjacent cell FA according to the center frequency control signal output from the modem block, and outputs the RF local oscillation frequency to the mixer. That is, the RF local oscillator oscillates the RF frequency while shifting to the center frequency of the corresponding cell FA or the adjacent cell FA according to the center frequency control signal output from the modem block, thus making it possible for the mixer to convert the RF signal from the BPF into the IF signal.

The mixer converts the RF signal from the BPF into an IF signal by using the RF local oscillation frequency output from the RF local oscillator, and outputs the IF signal to the scalable LPF.

The scalable LPF filters the IF signal from the mixer while flexibly adjusting to the bandwidth of the corresponding cell FA or the adjacent cell FA according to the bandwidth control signal output from the modem block, and outputs the filtered IF signal to the AGC.

The AGC controls magnitude or gain of the IF signal output from the scalable LPF, and outputs it to the ADC.

The ADC converts the analog IF signal output from the AGC into a digital IF signal by using the sampling frequency matching with the bandwidth of the corresponding cell FA or the adjacent cell FA according to the ADC control signal output from the modem block, and outputs the digital IF signal to the modem block.

The modem block converts the digital IF signal into a digital baseband signal, demodulates the digital baseband signal according to FFT size specified in 3GPP LTE TR25.814, changes the center frequency of the RF local oscillator by outputting the center frequency control signal to the RF local oscillator according to the control information from the upper layer, controls the bandwidth of the scalable LPF by outputting the bandwidth control signal to the scalable LPF, and controls the sampling frequency of the ADC according to the bandwidth of the scalable LPF by outputting the ADC control signal to the ADC.

Next, a DIF receiver supporting a scalable bandwidth in a variable bandwidth scenario environment and a receiving method thereof will be described below.

The DIF receiver supporting the scalable bandwidth in the variable bandwidth scenario environment includes a data communication path forming block, a separate SCH/BCH path forming block, and a modem block.

The data communication path forming block forms the path for the data communication with the home cell by changing the center frequency to the center frequency of the home cell FA according to a first center frequency control signal output from the modem block, adjusting the bandwidth to the bandwidth of the home cell FA according to the bandwidth control signal output from the modem block, and adjusting the sampling frequency corresponding to the bandwidth of the home cell FA according to the ADC control signal output from the modem block.

The data communication path forming block includes a BPF, a first mixer or I/Q mixer, a first RF local oscillator, a scalable LPF, a first AGC, and a first ADC. The BPF filters an RF signal received through an RX antenna with a bandwidth within which all FAs of the same service provider can be accommodated. The first RF local oscillator oscillates an RF frequency while shifting to a center frequency of a home cell FA according to a first center frequency control signal output from the modem block, and outputs a first RF local oscillation frequency to the first mixer. The first mixer converts the RF signal from the BPF into an IF signal by using the first RF local oscillation frequency output from the first RF local oscillator. The scalable LPF filters the IF signal from the first mixer while flexibly adjusting to the bandwidth of the home cell FA according to a bandwidth control signal output from the modem block. The first AGC controls magnitude or gain of the IF signal output from the scalable LPF. The first ADC converts the analog IF signal output from the first AGC into a first digital IF signal by using a sampling frequency matching with a bandwidth of the home cell FA according to an ADC control signal output from the modem block.

The separate SCH/BCH path forming block forms a separate SCH/BCH path for handover by changing the center frequency to the center frequency of the corresponding cell FA or the adjacent cell FA according to a second center frequency control signal output from the modem block.

The separate SCH/BCH path forming block includes a second mixer or I/Q mixer, a second RF local oscillator, a fixed bandwidth LPF, a second AGC, and a second ADC. The second RF local oscillator oscillates an RF frequency while shifting to the center frequency of the corresponding cell FA or the adjacent cell FA according to a second center frequency control signal output from the modem block, and outputs a second RF local oscillation frequency to the second mixer. The second mixer converts the RF signal from the BPF into an IF signal by using the second RF local oscillation frequency output from the second RF local oscillator. The fixed bandwidth LPF filters the IF signal from the second mixer according to the SCH or BCH bandwidth of the corresponding cell FA or the adjacent cell FA. The second AGC controls magnitude or gain of the IF signal output from the fixed bandwidth LPF. The second ADC converts the analog IF signal output from the second AGC into a second digital IF signal by using a sampling frequency matching with the SCH or BCH bandwidth of the corresponding cell FA or the adjacent cell FA.

Instead of the fixed bandwidth LPF, the separate SCH/BCH path forming block may use a scalable LPF that filters the IF signal output from the second mixer while flexibly adjusting the bandwidth to the SCH or BCH bandwidth of the corresponding cell FA or the adjacent cell FA according to the bandwidth control signal output from the modem block.

The modem block demodulates the first digital IF signal received via the data communication path with the RX bandwidth of the home cell FA according to the FFT size specified in 3GPP LTE TR25.814, outputs the first center frequency control signal, the bandwidth control signal, and the ADC control signal to the data communication path forming block according to the control information output from the upper layer, demodulates the second digital IF signal received via the separate SCH/BCH path with the SCH or BCH bandwidth according to the FFT size specified in 3GPP LTE TR25.814, and outputs the second center frequency control signal to the separate SCH/BCH path forming block according to the control information output from the upper layer.

Next, an analog intermediate frequency (AIF) receiver and a receiving method thereof will be described below. More specifically, an AIF receiver supporting a scalable bandwidth and a receiving method thereof will be described below.

First, an RX antenna receives an RF signal from a transmitter over a wireless channel and transfers the received RF signal to a first BPF.

The first BPF filters the received RF signal with the bandwidth within which all FAs of the same service provider can be accommodated, and outputs the filtered RF signal to an RF mixer.

The RF local oscillator oscillates the RF frequency while shifting to the center frequency of the corresponding cell FA or the adjacent cell FA according to the center frequency control signal output from the modem block, and outputs the RF local oscillation frequency to the RF mixer.

The RF mixer converts the RF signal from the first BPF into an IF signal by using the RF local oscillation frequency output from the RF local oscillator, and outputs the IF signal to a second BPF.

The second BPF filters the IF signal from the RF mixer and outputs the filtered IF signal to an IF mixer.

An IF local oscillator oscillates an IF frequency and outputs an IF local oscillation frequency to the IF mixer.

The IF mixer converts the IF signal from the second BPF into a baseband signal by using the IF local oscillation frequency output from the IF local oscillator, and outputs the baseband signal to a scalable LPF.

The scalable LPF filters the IF signal from the IF mixer while flexibly adjusting to the bandwidth of the corresponding cell FA or the adjacent cell FA according to the bandwidth control signal output from the modem block, and outputs the filtered IF signal to the AGC.

The AGC controls magnitude or gain of the baseband signal output from the scalable LPF, and outputs it to the ADC.

The ADC converts the analog baseband signal output from the AGC into a digital baseband signal by using the sampling frequency matching with the bandwidth of the corresponding cell FA or the adjacent cell FA according to the ADC control signal output from the modem block, and outputs the digital baseband signal to the modem block.

The modem block demodulates the digital baseband signal according to FFT size specified in 3GPP LTE TR25.814, changes the center frequency of the RF local oscillator by outputting the center frequency control signal to the RF local oscillator according to the control information from the upper layer, controls the bandwidth of the scalable LPF by outputting the bandwidth control signal to the scalable LPF, and controls the sampling frequency of the ADC according to the bandwidth of the scalable LPF by outputting the ADC control signal to the ADC.

Next, an AIF receiver supporting a scalable bandwidth in a variable bandwidth scenario environment and a receiving method thereof will be described below.

The AIF receiver supporting the scalable bandwidth in the variable bandwidth scenario environment includes a data communication path forming block, a separate SCH/BCH path forming block, and a modem block.

The data communication path forming block forms the path for the data communication with the home cell by changing the center frequency to the center frequency of the home cell FA according to a first center frequency control signal output from the modem block, adjusting the bandwidth to the bandwidth of the home cell FA according to the bandwidth control signal output from the modem block, and adjusting the sampling frequency corresponding to the bandwidth of the home cell FA according to the ADC control signal output from the modem block.

The data communication path forming block includes a BPF, a first RF mixer or I/Q mixer, a first RF local oscillator, a first IF BPF, a first IF local oscillator, a first IF mixer, a scalable LPF, a first AGC, and a first ADC. The BPF filters an RF signal received through an RX antenna with a bandwidth within which all FAs of the same service provider can be accommodated. The first RF local oscillator oscillates an RF frequency while shifting to a center frequency of a home cell FA according to a first center frequency control signal output from the modem block, and outputs a first RF local oscillation frequency to the first RF mixer. The first RF mixer converts the RF signal from the BPF into an IF signal by using the first RF local oscillation frequency output from the first RF local oscillator. The first IF BPF filters the IF signal output from the first RF mixer. The first IF local oscillator oscillates the IF frequency to output an IF local oscillation frequency. The first IF mixer converts the IF signal from the first IF BPF into a baseband signal by using the first IF local oscillation frequency output from the first IF local oscillator. The scalable LPF filters the baseband signal from the first IF mixer while flexibly adjusting to the bandwidth of the home cell FA according to a bandwidth control signal output from the modem block. The first AGC controls magnitude or gain of the baseband signal output from the scalable LPF. The first ADC converts the analog baseband signal output from the first AGC into a first digital baseband signal by using a sampling frequency matching with a bandwidth of the home cell FA according to an ADC control signal output from the modem block.

The separate SCH/BCH path forming block forms a separate SCH/BCH path for handover by changing the center frequency to the center frequency of the corresponding cell FA or the adjacent cell FA according to a second center frequency control signal output from the modem block.

The separate SCH/BCH path forming block includes a second mixer or I/Q mixer, a second RF local oscillator, a second IF BPF, a second IF local oscillator, a second IF mixer, a fixed bandwidth LPF, a second AGC, and a second ADC. The second RF local oscillator oscillates an RF frequency while shifting to the center frequency of the corresponding cell FA or the adjacent cell FA according to a second center frequency control signal output from the modem block, and outputs a second RF local oscillation frequency to the second mixer. The second mixer converts the RF signal from the BPF into an IF signal by using the second RF local oscillation frequency output from the second RF local oscillator. The second IF BPF filters the IF signal output from the second RF mixer. The second IF local oscillator oscillates the IF frequency to output a second IF local oscillation frequency. The second IF mixer converts the IF signal from the second IF BPF into a baseband signal by using the second IF local oscillation mixer. The fixed bandwidth LPF filters the baseband signal from the second IF mixer according to the SCH or BCH bandwidth of the corresponding cell FA or the adjacent cell FA. The second AGC controls magnitude or gain of the baseband signal output from the fixed bandwidth LPF. The second ADC converts the analog baseband signal output from the second AGC into a second digital baseband signal by using a sampling frequency matching with the SCH or BCH bandwidth of the corresponding cell FA or the adjacent cell FA.

Instead of the fixed bandwidth LPF, the separate SCH/BCH path forming block may use a scalable LPF that filters the baseband signal output from the second IF mixer while flexibly adjusting the bandwidth to the SCH or BCH bandwidth of the corresponding cell FA or the adjacent cell FA according to the bandwidth control signal output from the modem block.

The modem block demodulates the first digital baseband signal received via the data communication path with the RX bandwidth of the home cell FA according to the FFT size specified in 3GPP LTE TR25.814, outputs the first center frequency control signal, the bandwidth control signal, and the ADC control signal to the data communication path forming block according to the control information output from the upper layer, demodulates the second digital baseband signal received via the separate SCH/BCH path with the SCH or BCH bandwidth according to the FFT size specified in 3GPP LTE TR25.814, and outputs the second center frequency control signal to the separate SCH/BCH path forming block according to the control information output from the upper layer.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

What is claimed is:

1. A receiving method for supporting scalable bandwidth, the receiving method comprising:
    down-converting a first signal by using a local oscillation signal whose frequency is controlled by a frequency control signal;
    scalable-filtering the down-converted signal wherein bandwidth of the scalable-filtering is controlled by a bandwidth control signal; and
    converting the scalable-filtered signal into a digital signal by using a sampling frequency controlled by a sampling control signal;
    wherein, to support the scalable bandwidth, the frequency control signal, the bandwidth control signal and the sampling control signal are generated according to control information received from an upper layer, and the sampling frequency matches with bandwidth of a corresponding cell frequency allocation or an adjacent cell frequency allocation.

2. The receiving method of claim 1, further comprising:
    filtering a radio frequency signal to output the first signal.

3. The receiving method of claim 1, the scalable-filtering comprises:
    filtering the down-converted signal to output a second signal; and
    gain-controlling the second signal to output the scalable-filtered signal.

* * * * *

UNITED STATES PATENT AND TRADEMARK OFFICE
CERTIFICATE OF CORRECTION

PATENT NO. : 8,619,914 B2  
APPLICATION NO. : 13/683544  
DATED : December 31, 2013  
INVENTOR(S) : Moon Sik Lee et al.

Page 1 of 1

It is certified that error appears in the above-identified patent and that said Letters Patent is hereby corrected as shown below:

Title page, add item (63) as follows:

Related U.S. Application Data

(63) Continuation of application No. 12/445,234, filed on Apr. 10, 2009, now Pat. No. 8,340,219, filed as application No. PCT./KR2007/004938 on Oct. 10, 2007.

Signed and Sealed this  
Twenty-fifth Day of February, 2014

Michelle K. Lee  
*Deputy Director of the United States Patent and Trademark Office*